Aug. 30, 1932.  G. C. HENNESY  1,874,521
AIRPLANE
Filed Aug. 28, 1929
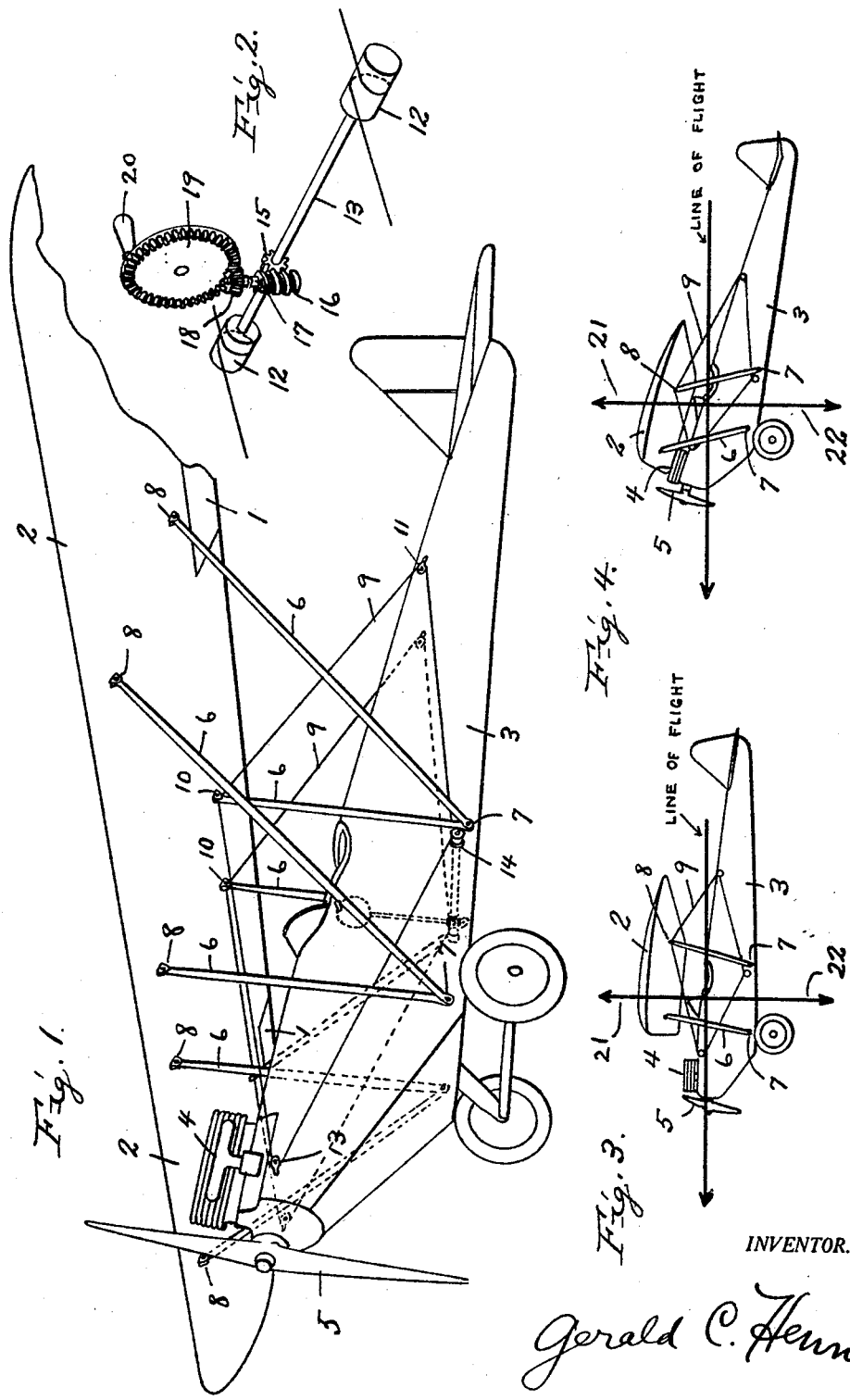
INVENTOR.
Gerald C. Hennesy Patented Aug. 30, 1932

1,874,521

UNITED STATES PATENT OFFICE

GERALD C. HENNESY, OF WASHINGTON, DISTRICT OF COLUMBIA

AIRPLANE

Application filed August 28, 1929. Serial No. 389,033.

This invention relates to airplanes and the primary object is to increase the safety of the airplane, in doing this I make it possible to land in a restricted space with comparative safety, I do this by having a low center of gravity and properly balancing the airplane while it is in flight, other objects and advantages of this invention will be appreciated after the drawing is read in conjunction with the following description and claim.

In the drawing: Figure 1 is a perspective view of my airplane. Figure 2 is a diagrammatic view of the control device which is part of my invention. Figure 3 is a view of my airplane in horizontal flight, the wings having an angle of incidence of 2 degrees. Figure 4 is a view of my airplane in horizontal flight, the wings having an angle of incidence of 18 degrees.

My airplane as shown is of the monoplane design, having the usual horizontal and vertical control at the rear, lateral stabilizers 1 on the wings 2, these controls being connected to the usual control stick, at the front of the fuselage 3 is a motor 4 and propeller 5, the wings 2 are connected to the fuselage 5 by eight struts 6 which are pivoted to the fuselage 3 at 7, and pivoted to the wings 2 at 8. This connection permits the wings to move in a horizontal direction, that is, forward or backward over the fuselage 3 and still maintain the same parallel relation thereto, the position of the wings with relation to the fuselage is controlled by the wires 9 which are fastened to the two rear center struts 6 as at 10, from there passing rearwardly over pulleys 11, from pulleys 11 to drums 12 on which they are wound, from drums 12 to pulleys 13 on the forward part of fuselage 3, then rearwardly to the rear center struts 6 and fastened at 10.

It can be seen that when the drums 12 are turned the wings are moved forward or backward over the fuselage of the plane.

The drums 12 are fixed on a shaft 13 which is mounted in the fuselage at 14, fixed to the shaft 13 is a spur gear 15 which meshes with a worm gear 16 on a vertical shaft 17, on the upper end of the vertical shaft 17 is fixed a small bevel gear 18 which meshes with the large bevel gear 19 which has a handle 20 by which the pilot of the airplane can move the wing forward or backward over the fuselage of the airplane, the worm 16 and spur gear 15 which act as a lock to keep the wings fixed in any position.

It can be seen from Figure 3 that when the airplane is flying at high speed with a small angle of incidence, the arrows 21 and 22 which represent the center of lift and the center of gravity pass through the forward part of the wings 2. Now if the pilot wishes to make a reduced speed landing, he lowers the tail of the airplane as in Figure 4 in order to have a greater angle of incidence, in the planes now in use this throws the center of lift of the wings back of the center of gravity of the plane, this increased angle of incidence causes the center of lift of the wings to move rearwardly, these two rearward movements of the center of lift unbalance the airplane, and cause it to either pancake or tailspin.

I overcome this by moving the wings forward as shown in Figure 4 where the center of lift and the center of gravity are on the same line 21 and 22:

What I claim is:

A monoplane comprising the combination of a fuselage, a main plane mounted for adjustment longitudinally on said fuselage, stabilizing and elevating planes mounted on said fuselage, the center of gravity of said monoplane being on a line perpendicular to the longitudinal axis of said monoplane, said line passing between the center of area of said main plane and the center of area of said stabilizing and elevating planes, means to adjust said main plane longitudinally of said fuselage to place said line through the center of lift of said main plane, means to lock said main plane while being adjusted and when adjusted.

In testimony whereof I affix my signature.

GERALD C. HENNESY.